United States Patent [19]

Ohashi

[11] Patent Number: 4,916,699

[45] Date of Patent: Apr. 10, 1990

[54] DIAGNOSTIC DATA PROCESSING SYSTEM WITH SELECTIVE TOUCH-SENSITIVE DISPLAY

[75] Inventor: Masakazu Ohashi, Kyoto, Japan

[73] Assignee: Sharp Kabushiki Kaisha, Osaka, Japan

[21] Appl. No.: 166,461

[22] Filed: Mar. 10, 1988

[30] Foreign Application Priority Data

Mar. 10, 1987 [JP] Japan ................................. 62-54400

[51] Int. Cl.[4] .............................................. G06F 11/00
[52] U.S. Cl. ..................................... 371/17; 340/712; 364/900; 371/16.5; 371/29.1
[58] Field of Search ................... 371/15, 29, 17, 16.5; 364/200 MS File, 900 MS File; 340/706, 712, 718

[56] References Cited

U.S. PATENT DOCUMENTS

| | | | |
|---|---|---|---|
| 4,202,041 | 5/1980 | Kaplow et al. | 364/900 |
| 4,434,489 | 2/1984 | Blyth | 371/29 |
| 4,521,870 | 6/1985 | Babbel et al. | 364/900 |
| 4,567,480 | 1/1986 | Blanchard | 340/712 |
| 4,672,558 | 6/1987 | Beckes et al. | 364/518 |
| 4,706,090 | 11/1987 | Hashiguchi et al. | 340/712 |
| 4,766,425 | 8/1988 | Tallman et al. | 340/712 |
| 4,771,277 | 9/1988 | Barbee et al. | 340/712 |
| 4,791,416 | 12/1988 | Adler | 340/712 |
| 4,803,463 | 2/1989 | Sado | 340/712 |

Primary Examiner—Charles E. Atkinson

[57] ABSTRACT

There is disclosed a data processing machine comprising a transparent position detecting device which is installed closely adjacent to a display device and which detects positions on the display screen. A block diagram display device displays a block diagram related to the execution of respective data processings. A functional diagnosis system is actuated when the selection of any of the respective blocks of the block diagram displayed on the display device is detected by the position detecting device. The diagnoses determines whether the function or data processing corresponding to the selected block is normal.

4 Claims, 5 Drawing Sheets

TEST MENU 2-1

For communications and other 19

| | |
|---|---|
| 1 Light I/F test | 6 Centronix test | 11 Ageing test |
| 2 Serial I/F 1 (SCU) test | 7 Display test | 12 RAM patch |
| 3 IC card test | 8 Reference clock test | 13 ROM read |
| 4 Serial I/F 2 (8257) test | 9 Calendar clock test | 14 I/O access |
| 5 Modem/NCU test | 10 Switch sense test | |

DIAGNOSTIC DATA PROCESSING SYSTEM WITH SELECTIVE TOUCH-SENSITIVE DISPLAY

BACKGROUND OF THE INVENTION

The invention relates to a data processing machine which automatically processes a plurality of data such, for example, as a POS terminal uses for management of, for example, sales of a store.

In a data processing machine which is conventionally used in a POS system, for example, a diagnosis is performed by simulation to determine whether an internal apparatus, such as a storage device or an arithmetic unit, operates normally. A conventional apparatus with which a diagnostic function may be carried out exists in the form of a data processing machine. An identifier selects the apparatus, or a number of apparatuses to specify the device. The selected device is inputted or an operator may look at a list of internal apparatuses displayed on a display device and input a corresponding number, thereby a diagnostic function to be executed on the selected device is performed.

In addition, a known data processing machine exists in which a display device has a touch response screen from which an operator can select the data to be displayed on the display device. Data is input as the operator touches, with his fingers, the portion of the touch response screen corresponding to the selected data.

However, in the aforementioned data processing machine, it was difficult to determine the correspondence between an identifier of the subject of diagnosis and the actual subject of diagnosis. It also was a time consuming form of input.

In the aforementioned data processing machine, data input can be simplified but the selection of the diagnostic function is not mentioned.

SUMMARY OF THE INVENTION

The present invention is designed in light of the above circumstances, to provide a data processing machine which is capable of easily determining a subject whose diagnostic function is desired to be executed As shown in FIG. 1, a preferred embodiment of the data processing machine, according to the present invention. The machine comprises a memory device 1 in which a plurality of data is stored along with data processing information for processing respective data which is related to the execution of data processing operations. The system further comprises an input device 2 which inputs data and specifies a desired data processing operation and a data processing device 3 which reads out the specified data processing information from the memory device 1 according to the signal from the input device 2 and executes the data processing operation according to the read out data processing information. Also included is a display device 4 which displays the contents of respective data processing operations; a transparent position detecting device 5 which detects the position on a display screen, installed closely adjacent to the display device 4; a block diagram display device 6 which causes the display device 4 to display a block diagram related, respectively, to the execution of data processing; and a function diagnosis device 7 which diagnoses whether the function or processing corresponding to a block is normal when any of the respective blocks of the block diagram displayed on the display device 4 is selected and subsequently detected by the position detecting device 5.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is a block diagram showing the display screen of the submenu No. 1 of the function diagnosis.

DESCRIPTION OF THE PREFERRED EMBODIMENT

The present invention will hereinafter be described in detail, in accordance with the embodiment shown in the following diagrams, but it shall be clearly understood that the present invention will not be limited by such embodiment.

Figure 1:
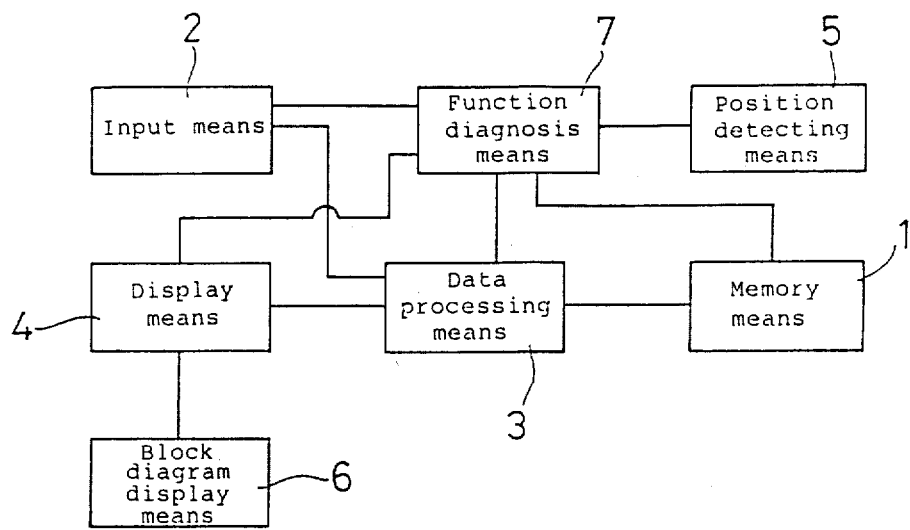
FIG. 1 is a block diagram of the present invention.
Figure 2:
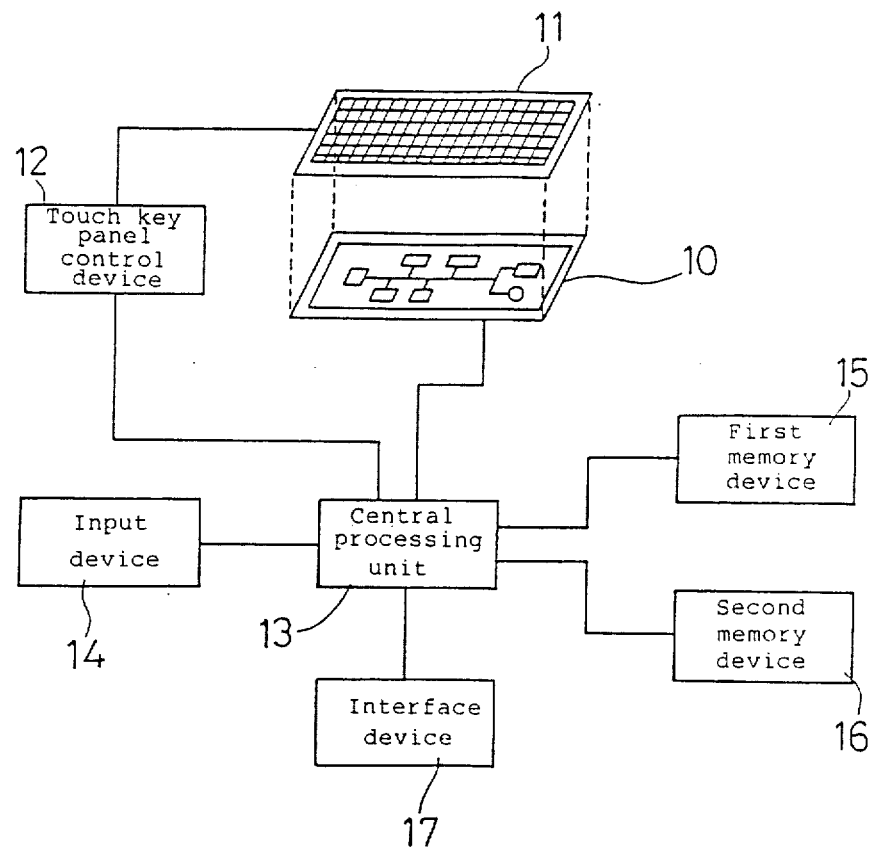
FIG. 2 is a block diagram of an embodiment of the present invention.

FIG. 2 is a block diagram showing an embodiment of the present invention.

Element 10 is a display device which displays a picture image by a liquid crystal display device such as a CRT or a dot matrix type device, and on the display screen thereof is closely installed a transparent touch key panel 11 for detecting positions on the display screen. The transparent touch key panel 11 is divided into a number of small areas and each of respective small areas is included with a transparent electrode. Each transparent electrode is connected to a touch key panel control device 12 so that when an operator touches any transparent electrode, the touch key panel control device 12 detects the change in electrostatic capacity and determines which small area has been specified. Results of this operation are inputted into a central processing unit 13. The central processing unit 13 is connected to, an input device 14 which provides data input; a first memory device 15 wherein various data processing information (programs) or inputted data are stored; a second memory device 16 which stores functional diagnostic information for diagnosing the functions of the central processing unit 13, input device 14, the first memory device 15 or the display device 10; and an interface device 17 for communication with an external data processing device or a printer. In this embodiment, the central processing device 13 is composed of a plurality of CPUs, that is, a master CPU, a first slave CPU, and a second slave CPU.

As functional diagnostic information, a picture image of a block diagram (refer to FIG. 3) comprising a plurality of blocks are shown in correspondence with the subject of a plurality of functional diagnosis. A diagnostic program for diagnosing (test by simulation) respective subjects of the functional diagnosis and criterion information for determining the results of diagnosis are prepared.

Figure 3:
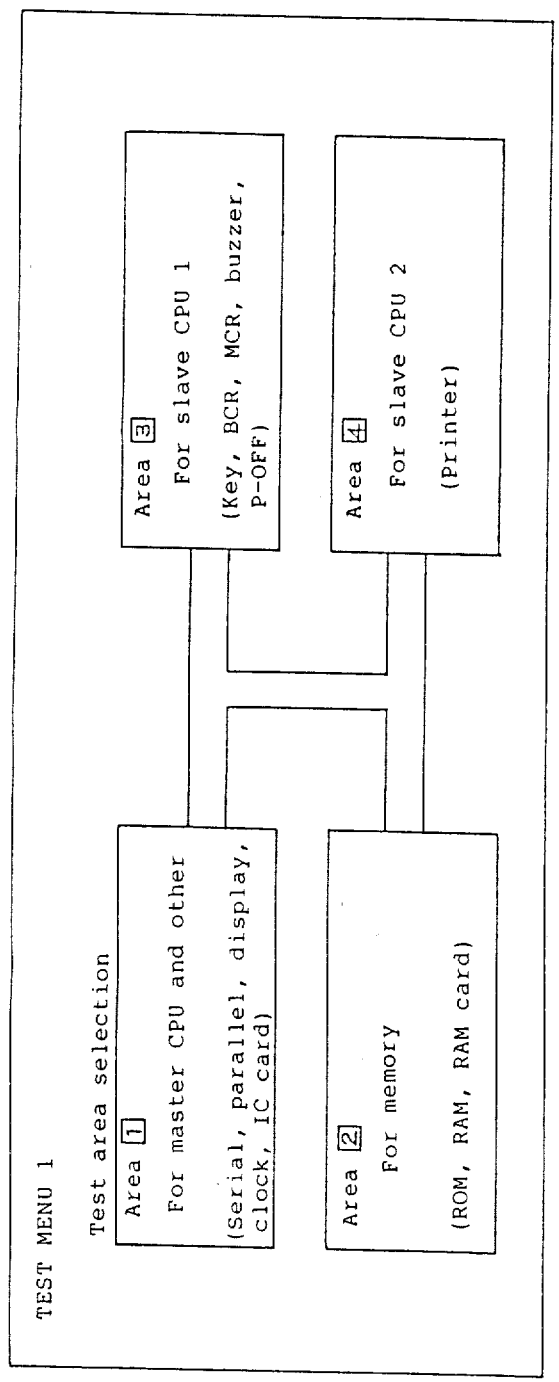
FIG. 3 is a block diagram showing the display screen of the block diagram of function diagnosis.
Figure 4:
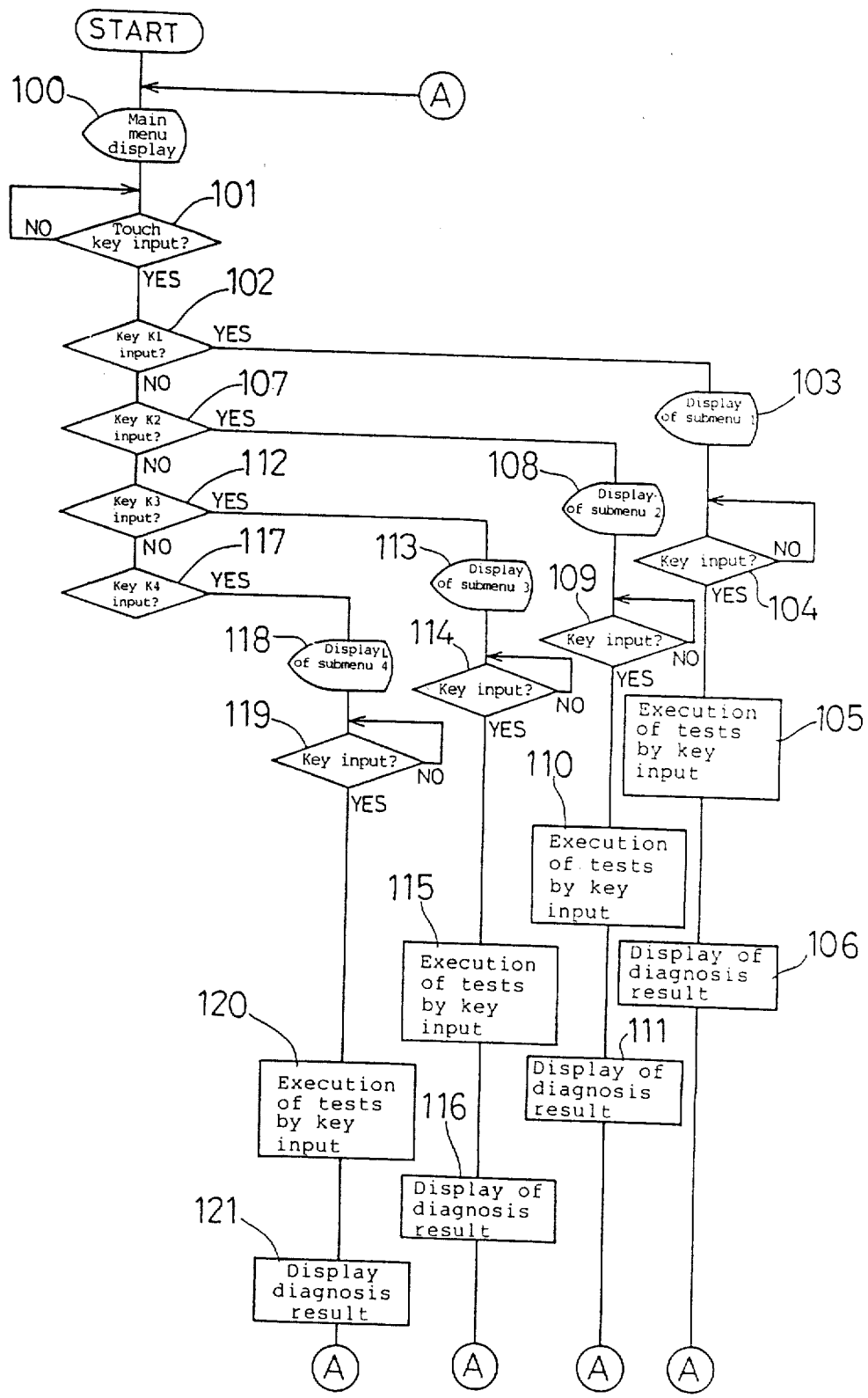
FIG. 4 is a flowchart showing the operation of the embodiment.

Operations of this embodiment will now be described with reference to FIG. 3 through FIG. 5.

When a functional diagnosis is designated from the input device 14, the central processing device 13 causes the display device 10 to display (step 100) the block diagram which is the functional diagnosis main menu (test menu 1). As shown in FIG. 3, the block diagram of the main menu is composed of an area [1], area [2], area [3] and area [4]. The subject of diagnosis indicated by the area [1] relates to the master CPU and is intended for the functional diagnosis of serial and parallel data communication, the display, the calendar clock and the IC card. The subject of diagnosis indicated by the area [2] relates to the first memory device 15 and is intended for the functional diagnosis of the ROM, the RAM, and the RAM cards. In the area [3], the subject of diagnosis related to a first slave CPU is indicated and the input device (key) 14, the BCR, the MCR, the buzzer, and the P-OFF are included in the subject of diagnosis. In the area [4], the second slave CPU is indicated as the subject of diagnosis and a printer is also included therein as a subject of diagnosis. In a condition where the block diagram is displayed, the central processing device 13 determines whether the portion corresponding to any area of the touch key panel 11 is touched by an operator, that is whether the touch key input is accomplished, according to the signal from the touch key panel control device 12 (step 101). When a touch key input is executed, it is determined whether it is the input of the key K1 which corresponds with the area [1] of the block diagram displayed on the display device 10 (step 102), and if it is the input of the key K1, that is, if the area [1] of the block diagram is selected, the submenu No. [1](test menu 2) shown in FIG. 5 is displayed on a display device (step 103). The submenu No. 1 fragments the master CPU function which is the subject of the functional diagnosis of the area [1] of the block diagram and displays the fragmented function as a list, and for example, the subject of the functional diagnosis comprising 14 items is displayed as shown in FIG. 5. Respective display item 18 is provided respectively corresponding to the item number 19. In a condition wherein the submenu No. 1 is displayed, the central processing device 13 determines whether the portion of the touch key panel 11 corresponding to the item number 19 has been touched (presence of key input) with fingers of an operator, according to the signal from the touch key panel control device 12 (step 104). When an key input is executed, that is, when the diagnostic function (test) indicated in the selected display item is executed (step 105), subsequent diagnostic results are displayed on the display means 10 (step 106). After an operator has confirmed the result of diagnosis, the main menu is displayed again as the operator accomplishes a specified input by the input device 14.

In the above arrangement, if the area [1] in the block diagram is not selected, the presence of the input of the key K2 corresponding to the area [2] of the block diagram is determined (step 107). If the area [2] is selected, that is, if the input of the key K2 is executed, as in the case of the area [1], the submenu No. 2 with fragmented diagnostic function is displayed (step 108), and the steps 109 and 111 which correspond with steps 104 to 106 are executed thereafter. If the area [1] and the area [2] are not selected but the area [3] is selected, that is, when the presence of the input of the key K3 is determined (step 112) and the input of the key K3 executed, the submenu No. 3 which is a submenu with respect to the area [3] is displayed, and steps 114 to 116 corresponding with steps 104 to 106 are exeucted thereafter. Further, if the area [1] area [2], and, area [3] are not selected, the presence of the input of the key K4 corresponding with the area [4] is determined (step 117), and if the input of the key K4 is executed, the submenu No. 4 which is a submenu with respect to the area [4] is displayed (step 118), and steps 119 to 121 corresponding to steps 104 to 106 are executed thereafter.

Incidentally, the touch key panel may be a resistive type, wherein two electrodes are arranged at an interval at a position to be detected, instead of a capacitive type which is described in the aforementioned embodiment.

In the aforementioned embodiment, the block diagram is composed of four blocks (areas); however, the number of the blocks may be increased or decreased according to circumstance by the number of the subject of functional diagnosis. In this case, the number of the subject of functional diagnosis can be chosen to provide less difficult operator selection.

According to the present invention, because the subject of the functional diagnosis is displayed in the form of a block diagram on the display screen, the selection of the subject of diagnosis becomes very easy, and because a transparent position detecting means is used, a data processing device which improves the operating performance during selection can be obtained.

While only certain embodiments of the present invention have been described, if will be apparent to those skilled in the art that various changes and modifications may be made therein without departing from the spirit and scope of the present invention as claimed.

I claim:

1. A self diagnostic data processor having plural diagnosable functions comprising:

processing means for performing plural diagnosable functions;

input means for generating a diagnosis mode signal;

said processing means performing diagnosis of at least one of said plural diagnosable functions in response to receipt of said diagnosis mode signal;

display means for displaying said plural diagnosable functions;

display drive means for driving said display means to present said plural diagnosable functions in a block diagram menu format in response to said diagnosis mode signal;

selection means for selecting one of said plural diagnosable functions, said selection means including a transparent touch-sensitive panel overlaying said display means which detects a touched position of said display means in order to provide a function indication signal corresponding to a selected diagnosable function;

said display drive means, in response to receipt of said function indication signal, driving said display means to present a submenu of plural tests applicable to said selected diagnosable function;

said selection means further provides a test indication signal corresponding to a touched position of said display screen which is indicative of a desired test; and function diagnosis means, responsive to said test indication signal, for carrying out said desired test and for generating a test result;

said display means displaying said test result.

2. The system of claim 1 wherein said data processor is a point of sale terminal.

3. A diagnostic method for use with a data processor of plural diagnosable functions, said diagnostic method comprising:

generating a diagnosis mode signal during which a diagnosis is carried out on a function of said data processor;

displaying on a display screen said plural diagnosable functions in a block diagram menu format in response to said diagnosis mode signal;

selecting one of said plural diagnosable functions through the use of a touch-sensitive panel which overlays said display screen in order to provide a function indication signal indicative of a touched position on said display screen which corresponds to a selected diagnosable function;

displaying on said display screen a submenu of plural tests applicable to said selected diagnosable function in response to said function indication signal;

selecting one of said plural tests through the use of said tough-sensitive panel in order to provide a test indication signal corresponding to a touched position of said display screen which is indicative of a desired test;

performing said desired test in response to said test indication signal in order to provide a test result; and displaying said test result on said display screen.

4. A method for carrying out a diagnosis on a function of a data processor having at least a plurality of function blocks, a display screen and a transparent touch-sensitive panel overlaying the display screen, comprising the steps of:

generating a signal for designating a diagnosis mode during which a diagnosis is carried out on a function of said data processor;

displaying a visual image having a plurality of areas on said display screen, in response to the generated diagnosis mode designating signal, each of said areas indicating a different one of said plurality of function blocks;

generating a first signal for selecting a function block from the displayed plurality of function blocks through touching of said transparent tough-sensitive panel, a touched position on said transparent touch-sensitive panel corresponding to one of the displayed plurality of function blocks;

displaying a plurality of diagnosable functions for the selected function block, on said display screen in response to said first selecting signal;

generating a second signal for selecting a function to be diagnosed from the displayed plurality of diagnosable functions through touching of said transparent touch-sensitive panel, a touched position on the panel corresponding to one of the displayed plurality of diagnosable functions;

carrying out a diagnosis on the selected function to generate a test result in response to said second selecting signal; and displaying said test result on said display screen.

* * * * *